United States Patent
Di Maggio et al.

(10) Patent No.: US 12,334,670 B2
(45) Date of Patent: Jun. 17, 2025

(54) SYSTEM AND METHOD FOR CARRYING OUT LEAKAGE TESTS

(71) Applicant: TE Connectivity Italia Distribution S.r.l., Turin (IT)

(72) Inventors: Stanislas Di Maggio, Turin (IT); Marcello Farinola, Turin (IT); Alessandro Genta, Collegno (IT)

(73) Assignee: TE Connectivity Italia Distribution S.R.L., Turin (IT)

( * ) Notice: Subject to any disclaimer, the term of this patent is extended or adjusted under 35 U.S.C. 154(b) by 664 days.

(21) Appl. No.: 17/689,658

(22) Filed: Mar. 8, 2022

(65) Prior Publication Data

US 2022/0294152 A1     Sep. 15, 2022

(30) Foreign Application Priority Data

Mar. 9, 2021 (IT) .................... 102021000005513

(51) Int. Cl.
*H01R 13/52*      (2006.01)
*G01M 3/26*       (2006.01)
*H01R 43/00*      (2006.01)

(52) U.S. Cl.
CPC .......... *H01R 13/5202* (2013.01); *G01M 3/26* (2013.01); *H01R 13/5213* (2013.01); *H01R 43/005* (2013.01)

(58) Field of Classification Search
None
See application file for complete search history.

(56) References Cited

U.S. PATENT DOCUMENTS

| | | | |
|---|---|---|---|
| 5,551,892 A | 9/1996 | Endo et al. | |
| 2009/0267372 A1 | 10/2009 | Chen | |
| 2014/0334080 A1 | 11/2014 | Kurle | |
| 2016/0336094 A1 | 11/2016 | Omura et al. | |
| 2019/0289739 A1 | 9/2019 | Dupont et al. | |

FOREIGN PATENT DOCUMENTS

| | | | | |
|---|---|---|---|---|
| CN | 202735052 U | | 2/2013 | |
| CN | 105658110 A | * | 6/2016 | ............ A45D 33/24 |
| CN | 209689857 U | | 11/2019 | |
| CN | 209992130 U | | 1/2020 | |
| CN | 212278029 U | | 1/2021 | |

(Continued)

OTHER PUBLICATIONS

Italian Search Report, Application No. 202100005513, dated Nov. 17, 2021, 24 pages.

(Continued)

*Primary Examiner* — Tho D Ta
(74) *Attorney, Agent, or Firm* — Barley Snyder

(57) ABSTRACT

A sealing assembly for sealing an electrical component having an opening includes a cover coupled with the electrical component and a plug assembly fixed to the cover. The cover has a through-hole for injecting air during leakage tests of the electrical component and a plurality of engaging elements. The plug assembly has a single wire seal sealing the through-hole and a plurality of locking elements reversibly engaging the engaging elements. The cover seals the opening of the electrical component in an air-tight manner when the plug assembly is inserted into the through-hole.

19 Claims, 5 Drawing Sheets

(56) References Cited

FOREIGN PATENT DOCUMENTS

| DE | 3931340 | A1 | 12/1990 | | |
|----|---------|----|---------|---|---|
| EP | 2022159 | | 2/2009 | | |
| EP | 2823277 | B1 | 10/2020 | | |
| JP | S54159287 | A | 12/1979 | | |
| JP | H7122331 | A | 5/1995 | | |
| JP | 2019207866 | A | 12/2019 | | |
| WO | 2007129205 | A2 | 11/2007 | | |
| WO | 2007129205 | A3 | 11/2007 | | |
| WO | WO-2019090666 | A1 * | 5/2019 | .............. | G01M 3/26 |

OTHER PUBLICATIONS

Single Wire Seals and Cavity Plugs, TE Automotive, Published Oct. 2016, 8 pages.
Korean Office Action dated May 30, 2024 with English translation, corresponding to Application No. 10-2022-0029314, 8 pages.
Extended European Search Report dated Jun. 27, 2022, Application No. 22160638.7-1001, 48 pages.
Extended European Search Report dated Sep. 9, 2022, Application No. 22160638.7-1001, 47 pages.
Indian Office Action, Application No. 202244011743, Dated: Sep. 23, 2022, 7 pages.
Office Action from the Japanese Patent Office dated Mar. 7, 2023 (with English Translation thereof), corresponding to Application No. 2022-033182 8 pages.

* cited by examiner

SYSTEM AND METHOD FOR CARRYING OUT LEAKAGE TESTS

CROSS-REFERENCE TO RELATED APPLICATIONS

This application claims the benefit of the filing date under 35 U.S.C. § 119(a)-(d) of Italian Patent Application No. 102021000005513, filed on Mar. 9, 2021.

FIELD OF THE INVENTION

The present invention refers to the technical field of electrical connectors. In particular, the present invention refers to a system and a method for carrying out a leakage test on electrical connectors.

BACKGROUND

End-of-line leakage tests are commonly performed to detect any leakage of air in electrical wires, for instance to detect any leakage of air along the length of electrical wires, and therefore to ensure that the electrical wires are airtight and are protected against the entrance of water and/or dust.

Document DE 3931340 discloses a method for pneumatic sheath testing of polyethylene insulated cables that are not longitudinally watertight, whereby leaks can be located and eliminated on site using a non-toxic test gas, before the cable newly laid in a cable trench is put into operation. Document DE 3931340 also discloses a detachable connection element for sensitive cable surface materials and different cable outer diameters, which, on the one hand, ensures reliable tightness when flushing in a test gas and, on the other hand, allows its individual system parts to be attached and detached frequently and quickly without the use of tools.

Document US 2016336094 refers to a shielded electric wire including a shielding layer. Air leakage tests are performed on the shielded electric wire by a method in which one end of the shielded electric wire is hermetically sealed and is immersed in a water tank filled with water and compressed air with 10 kPa is pumped from the other end. Specifically, the compressed air with 10 kPa is first pumped for 30 seconds, and in the case of no leak (that is, the case where bubbles are not blown out of one end side of the electric wire), compressed air with the pressure increased by 10 kPa is pumped. Then, as long as there is no leak, compressed airs with the pressures increased by 10 kPa are sequentially pumped, and a pressure of the compressed air at the time of an air leak is measured.

The main disadvantage of standard leakage tests is that the air is injected through the wires: in this way, the leakage tests take time and is difficult to perform.

SUMMARY

A sealing assembly for sealing an electrical component having an opening includes a cover coupled with the electrical component and a plug assembly fixed to the cover. The cover has a through-hole for injecting air during leakage tests of the electrical component and a plurality of engaging elements. The plug assembly has a single wire seal sealing the through-hole and a plurality of locking elements reversibly engaging the engaging elements. The cover seals the opening of the electrical component in an air-tight manner when the plug assembly is inserted into the through-hole.

BRIEF DESCRIPTION OF THE DRAWINGS

The invention will now be described by way of example with reference to the accompanying Figures, of which.

DETAILED DESCRIPTION OF THE EMBODIMENTS

In the following, the present invention is described with reference to particular embodiments as shown in the enclosed drawings. Nevertheless, the present invention is not limited to the particular embodiments described in the following detailed description and shown in the figures, but, instead, the embodiments described simply exemplify several aspects of the present invention, the scope of which is defined by the appended claims. Further modifications and variations of the present invention will be clear for the person skilled in the art. Therefore, the present description has to be considered as including all the modifications and/or variations of the present invention, the scope of which is defined by the appended claims. For simplicity, identical or corresponding components are indicated in the figures with the same reference numbers.

Figure 1:
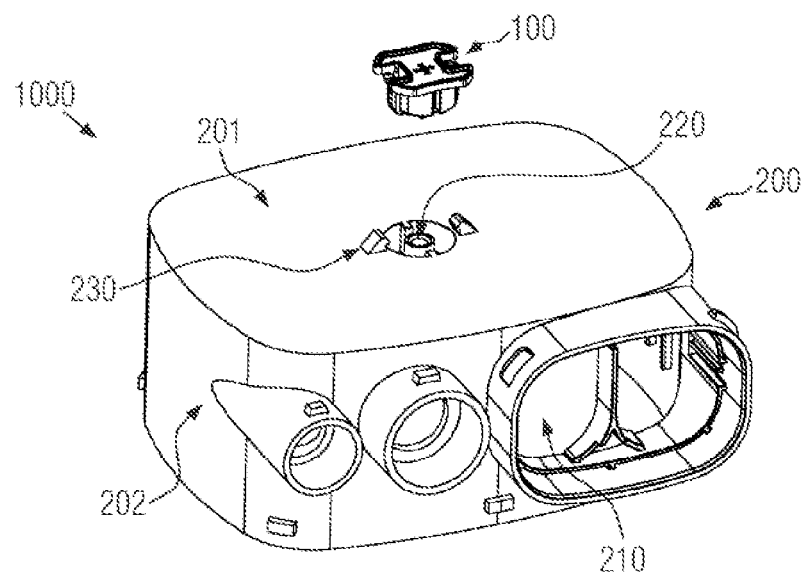
FIG. 1 is an exploded perspective view of a sealing assembly according to an embodiment.

A sealing assembly 1000, comprising a cover 200 for sealing an electrical component and a plug assembly 100, which can be realized according to the present invention, is schematically illustrated in FIG. 1. In an embodiment, the sealing assembly 1000, according to the present invention, is used for sealing electrical components used in high voltage applications, for example with a working voltage greater than 400 V. The sealing assembly 1000 is adapted to seal electrical components and, at the same time, to simplify and speed up leakage tests carried out on the electrical components.

The cover 200 is designed to seal any electrical component having an opening, wherein it is necessary to seal the opening of the electrical component against the entrance of water and dust. For instance, the electrical component may be a terminal box. The cover 200, which is shown in FIG. 1, further comprises four inlets 210 for accommodating electrical wires that can be connected to the terminals of the electrical component closed by the sealing cover 200. The inlets 210 are formed on a lateral surface 202. It is clear that, even if four inlets 210 for accommodating corresponding wires are represented in FIG. 1, any number of inlets could be realized in the cover 200 according to the present invention, for instance one, two, three, five, six, or more inlets. Moreover, the inlets 210 may be formed on any surface 201, 202 of the cover 200. In an alternative embodiment, the cover 200 may also not comprise any inlet 210 for inserting electrical wires and may be configured to simply cover and seal an opening of an electrical component. In an embodiment, the cover 200 is made of a polyimide material, which is flame-retardant and has a high Comparative Tracking Index (CTI) value.

Figure 2:
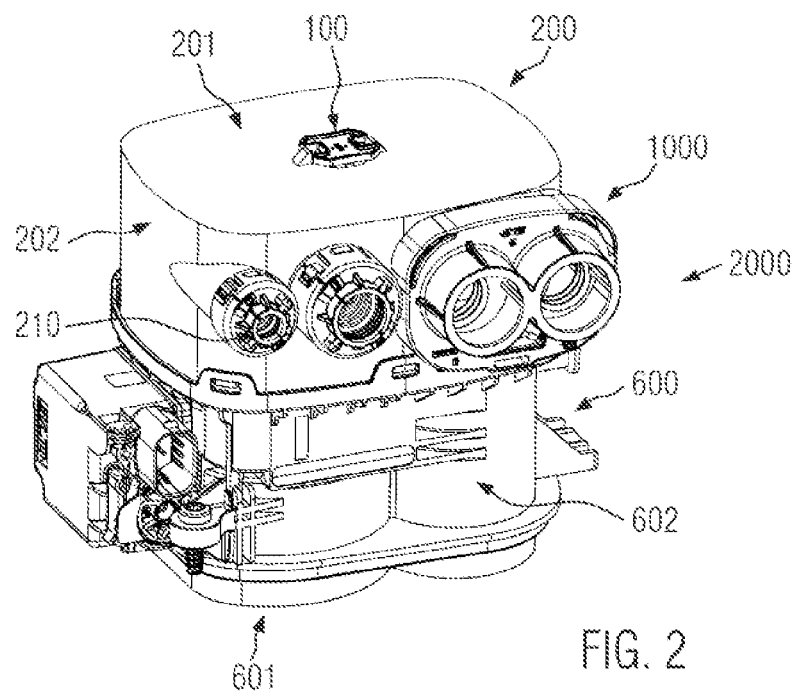
FIG. 2 is a perspective view of the sealing assembly mounted on a terminal box according to an embodiment.

FIG. 2 represents the sealed system 2000 comprising the sealing assembly 1000 mounted on a terminal box 600, according to an embodiment of the present invention. The terminal box 600 may indicate any electrical component comprising electrical terminals, printed circuit boards and/or electrical connections. The electrical connections of the terminal box 600 may be connected to electrical wires inserted into the inlets 210 of the cover 200. The terminal box 600 may be any electrical component for accommodating a plurality of electrical terminals and/or wires and/or printed circuit boards.

The terminal box 600 comprises four lateral surfaces 602 and a first surface 601 perpendicular to the four lateral surfaces, which define a housing for accommodating the electrical terminals. The side of the terminal box 600 opposite to the first surface 601 is sealed by the cover 200 and it is protected against the entrance of water and dust. In an embodiment, a lip of a second sealing material is placed around the inner perimeter of the terminal box 600, defined by the lateral surfaces 602, for assuring an even more reliable sealing between the cover 200 and the terminal box 600. Leakage tests may be performed to test the correct sealing at the interface between the cover 200 and the terminal box 600. The configuration of the cover 200 of the sealing assembly 1000 has the advantage to improve the serviceability and to simplify the leakage tests.

As illustrated in FIG. 1, the cover 200 comprises four lateral surfaces 202 and a first surface 201 perpendicular to the four lateral surfaces, which define a housing for accommodating a portion of the electrical component or of the terminal box 600, once it has been mounted on the opening of the electrical component or of the terminal box 600. A through-hole 220 for injecting air during leakage tests is integrated in the first surface 201 of the cover 200. Two engaging elements 230 are placed around the through-hole 220 for engaging corresponding locking devices of the plug assembly 100. The plug assembly 100 is configured to reversibly seal and close the through-hole 220 of the cover 200, once leakage tests have been completed. When the plug assembly 100 is inserted into the through-hole 220 of the cover 200, the cover 200 is adapted to seal in an airtight manner the electrical component to which it is attached. On the other hand, when the plug assembly 100 is removed from the through-hole 220, air can pass through the cover 200 and reach the electrical component.

Figure 3:
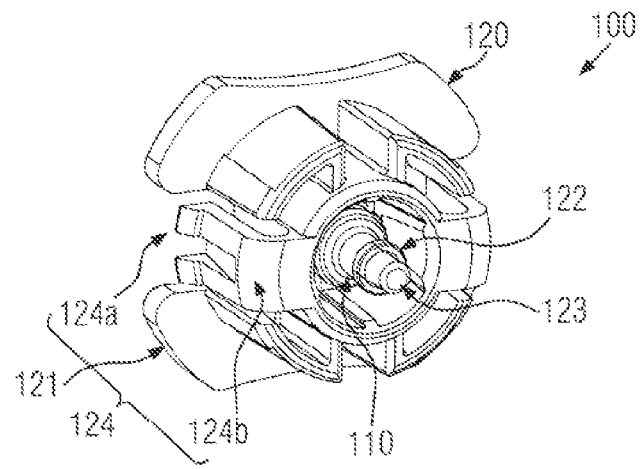
FIG. 3 is a perspective view of a plug assembly of the sealing assembly.

The plug assembly 100, according to the present invention is represented in detail in FIG. 3. The plug assembly 100 comprises a plug body 120 having a cavity 122 and a flat surface with a flange 121. A pin 123 is formed inside the cavity 122 and protrudes from the opposite side with respect to the flange 121. Two locking elements 124 are formed on the plug body 120. The end part of each locking element 124a is configured to engage the corresponding engaging element 230 of the cover 200, shown in FIG. 1, and to fix the relative position of the plug assembly 100 with respect to the cover 200. A single wire seal 110 is inserted onto the pin 123, in order to assure a sealing of the through-hole 220, when the plug assembly 100 is inserted into the through-hole 220 of the cover 200. In an embodiment, the pin 123 is completely covered by the single wire seal 110.

Figure 4:
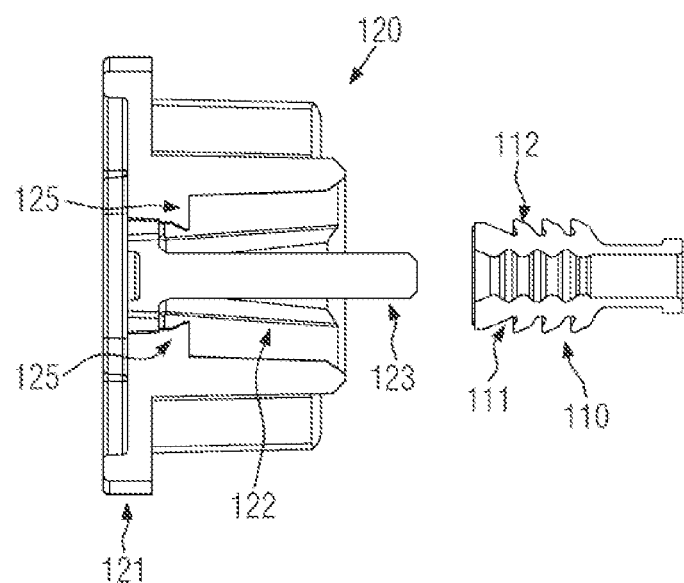
FIG. 4 is a sectional side view of the plug assembly.

The plug assembly 100 is also represented in FIG. 4, wherein a section of the plug body 120 and of the single wire seal 110 are represented. The plug body 120 comprises a flange 121 and a pin 123 formed inside the cavity 122, on the flange 121 and protruding from the opposite part with respect to the flange portion 121. The single wire seal 110 can be inserted on the pin 123. The single wire seal 110 can have a cylindrical shape.

The single wire seal 110 has an inner lip profile with a plurality of lips 112 separated by a plurality of recesses 111. In an embodiment, the inner lip profile comprises a three-lip configuration, as the one represented in FIG. 4. The three-lip configuration creates three layers of redundant sealing and therefore assures a continuous sealing surface and an airtight sealing. The single wire seal 110 may be made of silicon rubber; this rubber offers high mechanical resistance and can work in a very wide window of operating temperatures.

When the plug assembly 100 is assembled, the single wire seal 110 is inserted onto the pin 123, into the cavity 122 of the plug body 120. The difference between the outer diameter of the single wire seal 110 and the diameter of the cavity 122 generates a radial compression of the single wire seal 110 and a consequent sealing pressure at the interface with the cavity 122. This interface causes additional closure pressure on the interface of the pin 123, increasing the tightness level towards the pin 123.

Retaining features 125 for fixing the position of the single wire seal 110 inside the cavity 122 are formed at the base of the flange portion 121, around the pin 123, as shown in FIG. 4. The retaining features 125 ensure that the single wire seal 110 is not lost during assembly and disassembly of the plug assembly 100 on the cover 200. The retaining features comprise protruding elements 125 which are bent with respect to the flange 121 and which are configured to fit into a first recess 111 of the single wire seal 110. In an embodiment, the protruding elements 125 has three protruding elements displaced symmetrically around the pin 123, and spaced at 120° from one another. Other configurations are also possible, wherein four or more protruding elements 125 are placed symmetrically around the pin 123; for instance, a configuration in which four protruding elements 125 are spaced at 90° from one another, around the pin 123.

Figure 5:
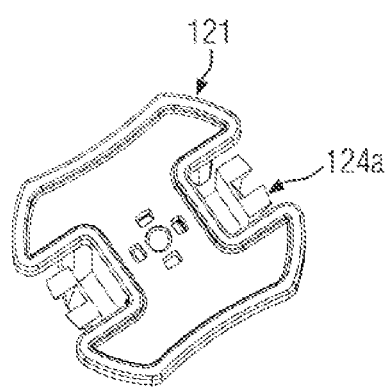
FIG. 5 is a perspective top view of the plug assembly with locking elements.

A top view of the plug assembly 100 is schematically illustrated in FIG. 5, wherein the part of the plug assembly 100 oriented towards the outside of the cover 200 is shown. In FIG. 5, it is possible to see that two locking devices 124, comprising two locking tabs 124a, are placed on two opposite sides of the flange portion 121. The tab portions 124a are configured to engage the complementary engaging elements 230 of the cover 200 and to fix the relative position of the plug assembly 100 with respect to the cover 200. For instance, the engaging elements 230 may be engagement noses and the locking tabs 124a may have a slit for accommodating the engagement nose 230 and for snap-engaging the two elements.

Figure 6:
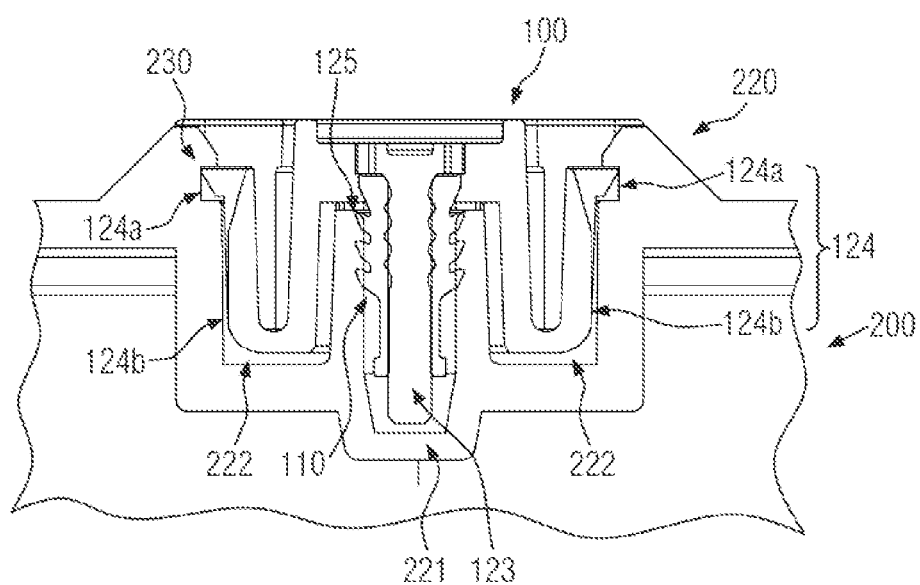
FIG. 6 is a sectional side view of the plug assembly in a hole of a sealing cover of the sealing assembly.

A sectional view of the plug assembly 100 inserted into the through-hole 220 of the cover 200 is schematically illustrated in FIG. 6. As can be seen in FIG. 6, the through-hole 220 of the cover 200 comprises two concentric cylindrical portions, in particular a central pass-through channel 221 and a surrounding cavity 222. The sealing assembly 1000 is configured in such a way that, when the plug assembly 100 is mounted onto the cover 200, the pin 123, accommodating the single wire seal 110, is inserted into the pass-through channel 221. The inner lip profile of the single wire seal 110 assures good sealing of the pass-through channel 221, when the plug 120 is inserted into the through-hole 220. The single wire seal 110 is oriented so that a first recess 111 is engaged with the retaining features 125 of the plug body 120, so that the single wire seal 110 remains in its position during assembling and disassembling of the sealing assembly 1000.

When the plug assembly 100 is inserted into the through-hole 220 of the cover 200, a perfect sealing of the pass-through channel 221 is assured by the configuration of the single wire seal 110. The retaining of the single wire seal 110 in its position is assured by the retaining elements 125 and does not require crimping. In this case, if the single wire seal 110 is damaged during operation, it can easily be replaced with a new single wire seal 110 without a need to replace the whole plug assembly 100.

As shown in FIG. 6, the plug assembly 100 further comprises locking elements 124 with a flap portion 124*b*, which is configured to be inserted into the cavity 222 of the through-hole 220. In this way, the position of the plug assembly 100 with respect to the cover 200 is fixed not only by the locking tabs 124*a*, engaged with the engaging elements 230, but also by the locking elements 124, because the flap portions 124*b* are stably inserted into the cavity 222.

Figure 7:
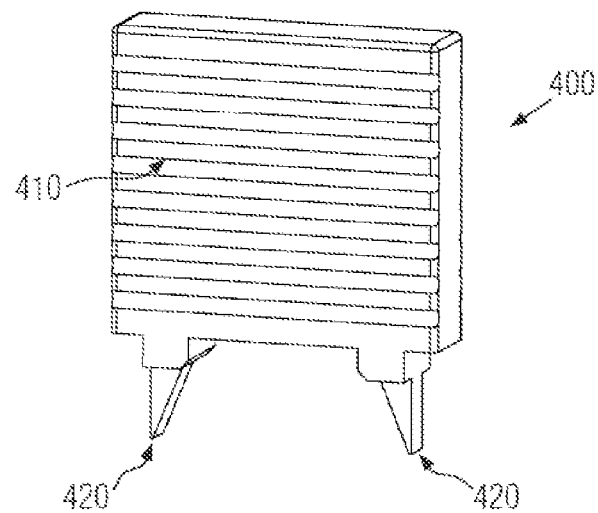
FIG. 7 is a perspective view of a disengaging element according to an embodiment.

The sealing assembly 1000, according to the present invention, may be further provided with a disengaging element 400 for easily removing the plug assembly 100 from the cover 200. The disengaging element 400 is schematically represented in FIG. 7. The disengaging element 400 comprises a gripping part 410 and two protruding elements 420 to be inserted into the locking elements 124, in order to disengage them from the engaging elements 230. The gripping part 410 is a flat part, which can be easily gripped and handled by an operator. The protruding elements 420 are two wedge-shaped elements, which are slightly bent or tilted with respect to the line defining the base of the flat element 410. The two protruding elements 420 are configured to be inserted into the tabs 124*a* of the locking elements 124, in order to remove them from their engaging position with respect to the engaging elements 230. In other words, the protruding elements 420, pressing on the flap portions 124*b*, make the locking tabs 124*a* slide away from the engagement noses 230, thus disengaging the two elements.

The operation of the sealing assembly 1000, according to the present invention, is schematically illustrated with reference to FIGS. 8 and 9.

Figure 8:
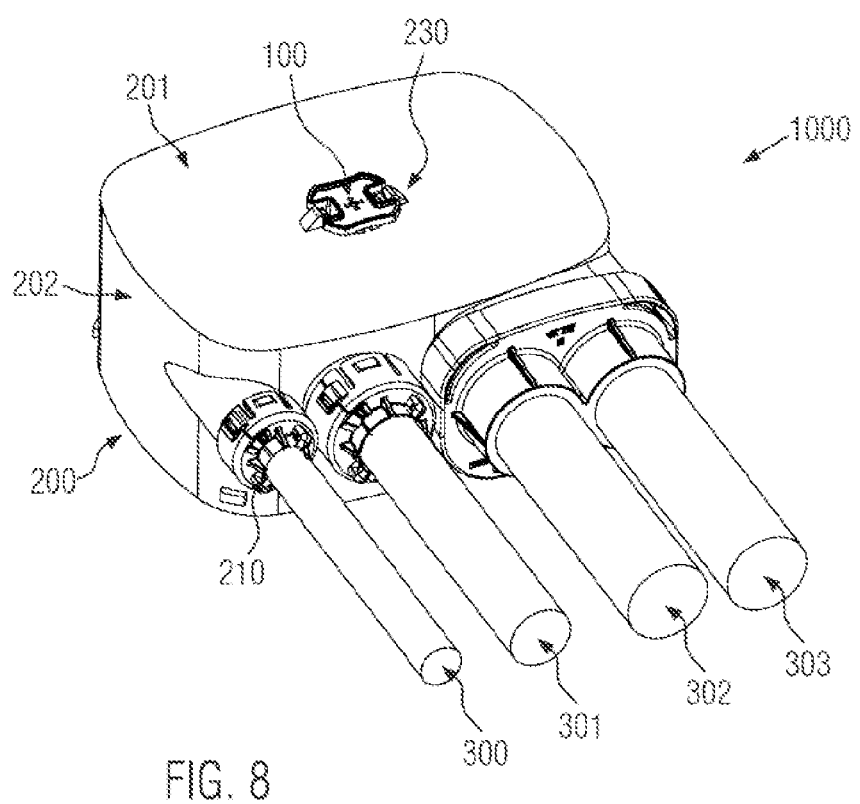
FIG. 8 is a perspective view of the sealing assembly with a plurality of electrical wires.

In FIG. 8, the sealing assembly 1000, according to the present invention, comprising four inlets 210, which accommodate corresponding electrical wires 300, 301, 302, 303, is schematically represented. The electrical wires 300, 301, 302, 303 of FIG. 8 have different dimensions and the inlets 210 have different diameters, mating the diameters of the corresponding electrical wires 300, 301, 302, 303. The plug assembly 100 is initially inserted into the cover 200 and, in this way, the through-hole 220 is air tightly-sealed by the plug assembly 100, so that air cannot penetrate through the first surface 201 of the cover 200. Moreover, the inlets 210 are adapted so that the interface between the electrical wires 300, 301, 302, 303 and the inlets 210 is air-tightly sealed and air cannot penetrate through the inlets 210. The sealing assembly 1000 comprising the electrical wires 300, 301, 302, 303 may be mounted on an electrical component having an opening, for instance on the terminal box 600, as illustrated in FIG. 2. It has to be understood that, in the initial configuration when the plug assembly 100 is inserted into the through-hole 220, the entrance of water or dust into the cover 200, and thus into the electrical wires 300, 301, 302, 303 and/or into the terminal box 600, is prevented, because the sealed system 2000 is air-tightly sealed.

When it is necessary to perform an air leakage test, the disengaging element 400 may be used to disengage the locking elements 124 from the engaging elements 230 and to remove the plug assembly 100 from its position on the cover 200. When the plug assembly 100 is removed, the through-hole 220 is open and is free to accommodate, for instance, a pipe 500 for inserting pressurized air inside the through-hole 220 and into the cover 200, as shown in FIG. 9. The pipe 500 may be used, for instance, for injecting pressurized air for leakage tests. In an embodiment, during the process of performing a leakage test, the gap between the pipe 500 and the pass-through channel 221 may be sealed by a single wire seal, for instance a single wire seal similar to the one inserted into the plug assembly 100. When pressurized air is injected through the pipe 500, the air passes through the through-hole 220 and fills the inside of the cover 200. In this way, if there is any leakage in the terminal box 600, for instance if any leakage occurs at the interface between the cover 200 and the terminal box 600, it can be easily detected. For example, leakage tests may be performed by immersing the assembly in a container filled with water and by detecting the formation of potential air bubbles. In an embodiment, leakages at the interface between the cover 200 and the electrical component are tested, so that the components involved in the sealing process are tested. For example, the portion of the electrical wire 300, 301, 302, 303 that is located at the interface with the cover 200 may also be tested.

After the leakage test has been performed, the pipe 500 may be removed from the through-hole 220 and the plug assembly 100 may be again inserted into the through-hole 220 to close the cover 200. The position of the plug assembly 100 is fixed by the locking elements 124 engaged with the engaging elements 230 on the cover 200. A perfect sealing of the system is again assured by the single wire seal 110 of the plug assembly 100, which seals the pass-through channel 221. In this way, the leakage test process is simplified and it is carried out in a faster and more efficient way.

If the single wire seal 110 is damaged or lost during insertion and removal of the plug assembly 100 from the cover 200, it can be easily replaced by inserting a new single wire seal 110 having the desired features on the pin 123 of the plug assembly 100.

Figure 9:
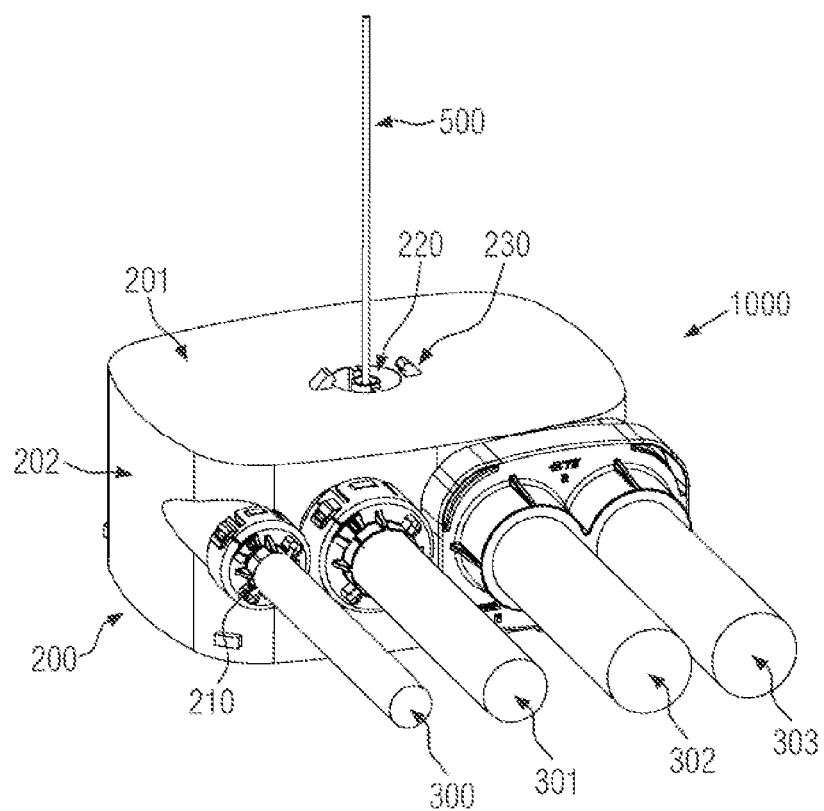
FIG. 9 is a perspective view of the sealing assembly of FIG. 8 during a leakage test.

It should be understood that, even if in FIGS. 2, 8 and 9 it has been represented that the sealing assembly 1000 may be used for sealing and testing terminal boxes 600 connected to wires 300, 301, 302, 303, the solution can be applied on all new generations of charging inlet platforms, but also on every other system where leakage tests are needed.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention.

For instance, even if only configurations wherein the connections between the electrical wires 300, 301, 302, 303 and the terminals of the electrical components are set at 90° have been disclosed, it is clear that also configurations at 180° are possible. Moreover, it is clear that the position of the through-hole 220 and/or of the inlets 210 on the surfaces of the cover 200 may be changed according to specific needs and that, for instance, the through-hole 220 may be formed on any lateral surface 202 and/or the one or more inlets 210 may be formed on any lateral surface 202 or on the first surface 201. In an embodiment, the inlets 210 and the through-hole 220 are formed on different surfaces to simplify insertion of the electrical wires 300, 301, 302, 303 and of the plug assembly 100.

According to a further embodiment of the present invention, a method for performing leakage tests on an electrical component having an opening is provided, the method comprising:
- a) Mounting the sealing assembly 1000 on the electrical component;
- b) Removing the plug assembly 100;
- c) Injecting air directly through the through-hole 220; and
- d) Detecting air leakage of the electrical component.

The sealing assembly 1000 can be easily mounted on any electrical component having an opening to be sealed and may be used for performing leakage tests in a simple, smart and repeatable way. In fact, the air can be injected directly through the through-hole 220 of the cover 200 and leakages of the electrical component can be easily detected. In an embodiment, the method further comprises the step of reversibly closing the through-hole 220 with the plug assembly 100.

The sealing assembly 1000 described above does not only assure that the electrical component is sealed against the entrance of water and dust, in an airtight manner, but it also makes simpler, more repeatable and more efficient the process of performing leakage tests. In this way, leakage tests may also be performed during usage of the electrical component and it is not necessary to disassemble it and to inject air through the electrical wires 300, 301, 302, 303. For instance, the correct sealing of the cover 200 and of the electrical component at their engaging interface, can be checked by injecting air directly through the through-hole 220 and not through the wires 300, 301, 302, 303 inserted into the electrical component, as performed in the prior art. The sealing assembly 1000 may be employed for any electrical component having an opening that needs to be closed and sealed in an airtight manner against the entrance of water and dust. In this way performing of leakage tests is simplified and the operation speed is improved.

In addition, those areas in which it is believed that those of ordinary skill in the art are familiar, have not been described herein in order not to unnecessarily obscure the invention described. Accordingly, it should be understood that the invention is not to be limited by the specific illustrative embodiments, but only by the scope of the appended claims. For instance, the leakage test process has not been described in detail, because it has been considered known to the skilled person.

What is claimed is:

1. A sealing assembly for sealing an electrical component having an opening, comprising:
   a cover coupled with the electrical component, the cover has a through-hole for injecting air during leakage tests of the electrical component and a plurality of engaging elements; and
   a plug assembly fixed to the cover, the plug assembly has a single wire seal sealing the through-hole and a plurality of locking elements reversibly engaging the engaging elements, the cover seals the opening of the electrical component in an air-tight manner when the plug assembly is inserted into the through-hole.

2. The sealing assembly of claim 1, wherein the cover has a first surface with the through-hole and a plurality of lateral surfaces perpendicular to the first surface, the first surface and the lateral surfaces define a housing accommodating a portion of the electrical component.

3. The sealing assembly of claim 1, further comprising a disengaging element having a gripping part and a pair of protruding elements, the protruding elements are inserted into the locking elements to disengage the locking elements from the engaging elements and permit removal of the plug assembly from the cover.

4. The sealing assembly of claim 1, wherein the plug assembly has a pin on which the single wire seal is disposed.

5. The sealing assembly of claim 4, wherein the plug assembly has a plurality of retaining elements at a base of the pin that fix a position of the single wire seal on the pin.

6. The sealing assembly of claim 5, wherein the retaining elements are a plurality of protruding elements engaging a plurality of mating recesses on the single wire seal.

7. The sealing assembly of claim 6, wherein the retaining element include at least three protruding elements symmetrically formed around the pin.

8. The sealing assembly of claim 4, wherein the through-hole has a pass-through channel receiving the single wire seal mounted on the pin.

9. The sealing assembly of claim 8, wherein the locking elements are a plurality of flaps and the through-hole has a cavity surrounding the pass-through channel, the cavity receives the flaps.

10. The sealing assembly of claim 1, wherein the electrical component has a terminal box including a plurality of electrical terminals.

11. The sealing assembly of claim 10, wherein the cover has an inlet receiving an electrical wire.

12. The sealing assembly of claim 11, wherein the electrical wire is connected to one of the electrical terminals of the terminal box.

13. A sealed system, comprising:
   a sealing assembly including a cover and a plug assembly fixed to the cover, the cover has a through-hole and a plurality of engaging elements, the plug assembly has a single wire seal sealing the through-hole and a plurality of locking elements reversibly engaging the engaging elements; and
   a terminal box having a plurality of electrical terminals, the cover closes an opening of the terminal box and seals the terminal box in an air-tight manner when the plug assembly is inserted into the through-hole.

14. The sealed system of claim 13, wherein the cover has a plurality of inlets receiving a plurality of electrical wires in an air-tight manner.

15. The sealed system of claim 14, wherein, when the electrical wires are inserted into the inlets, the sealed system is sealed in an air-tight manner.

16. A method for performing leakage tests, comprising:
   providing an electrical component having an opening;
   mounting a cover having a through-hole on the electrical component;
   injecting air through the through-hole;
   detecting air leakage of the electrical component; and
   mounting a plug assembly on the cover, the cover has a plurality of engaging elements, the plug assembly has a single wire seal sealing the through-hole and a plurality of locking elements reversibly engaging the engaging elements.

17. The method of claim 16, further comprising removing the plug assembly prior to performing the injecting and detecting steps.

18. The method of claim 17, wherein the through-hole is reversibly closed by the plug assembly.

19. The method of claim 17, wherein the removing step is performed with a disengaging element having a gripping part and a pair of protruding elements, the protruding elements are inserted into the locking elements to disengage the locking elements from the engaging elements and permit removal of the plug assembly from the cover.

* * * * *